Oct. 25, 1960
AN WANG
2,957,371
MECHANICAL PROPORTIONING MEANS
Filed Dec. 15, 1958
2 Sheets-Sheet 1
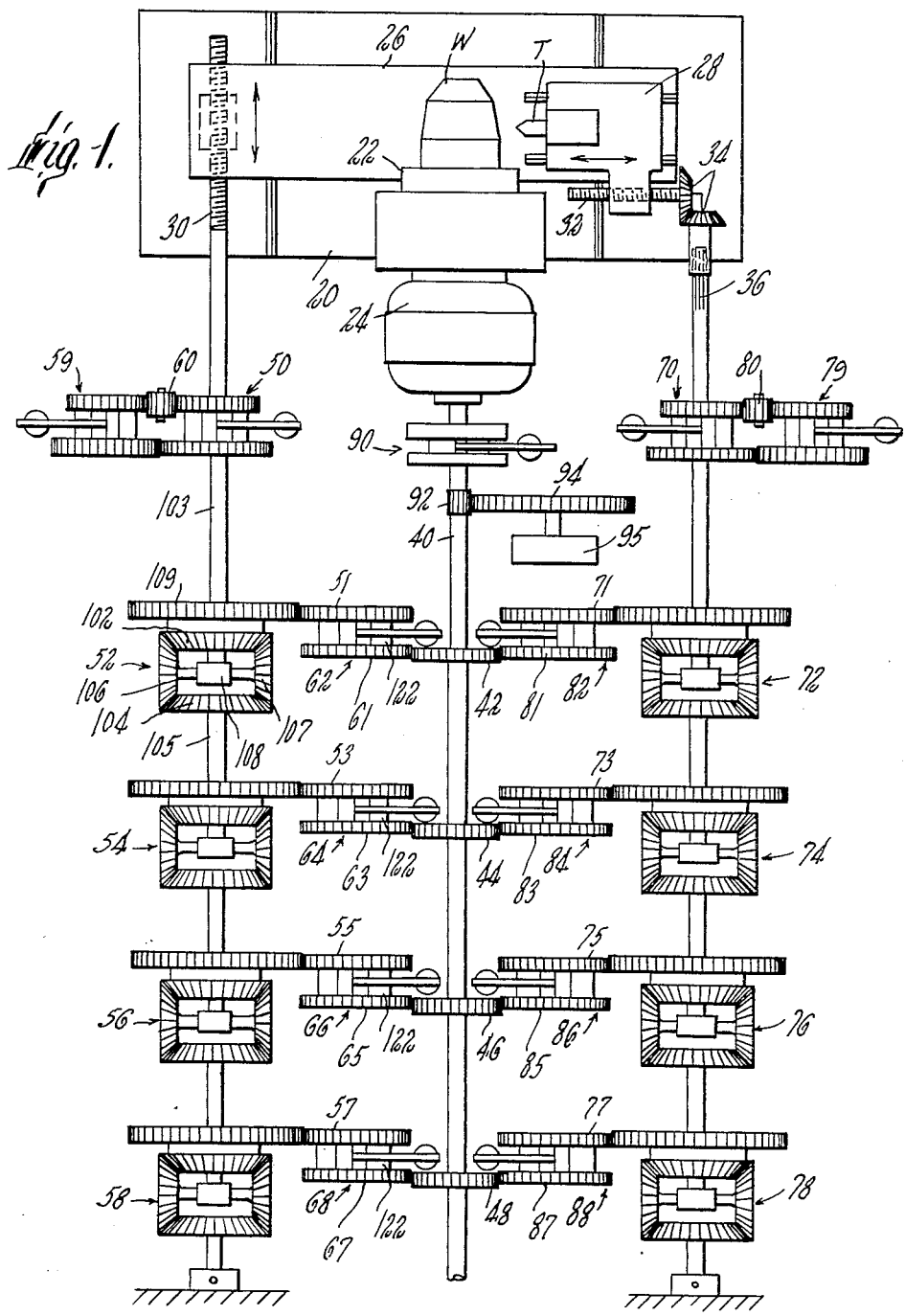

Oct. 25, 1960     AN WANG     2,957,371
MECHANICAL PROPORTIONING MEANS
Filed Dec. 15, 1958     2 Sheets-Sheet 2
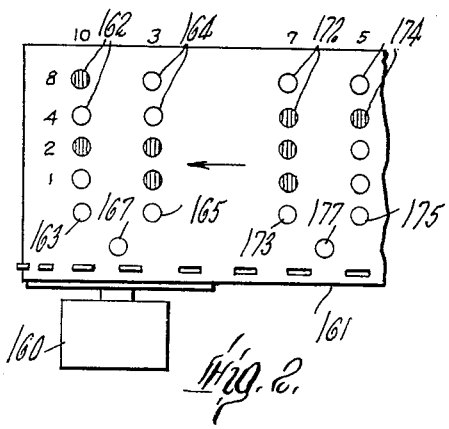
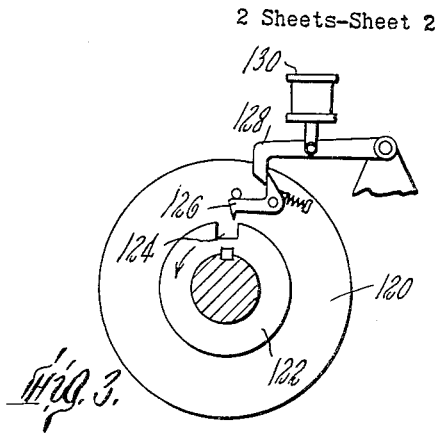
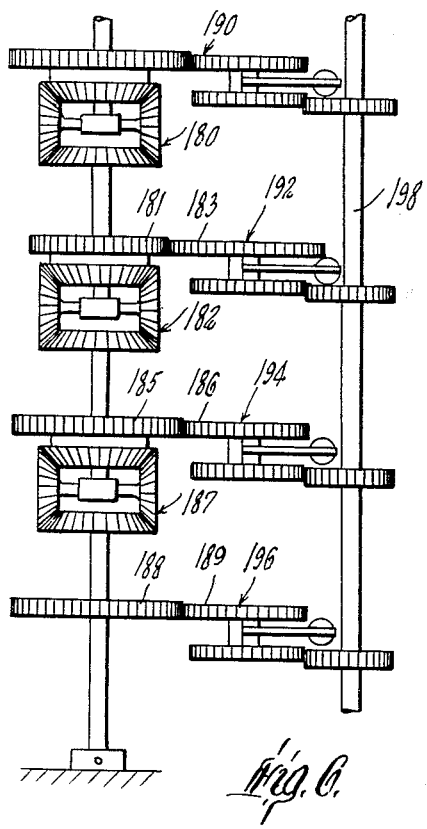
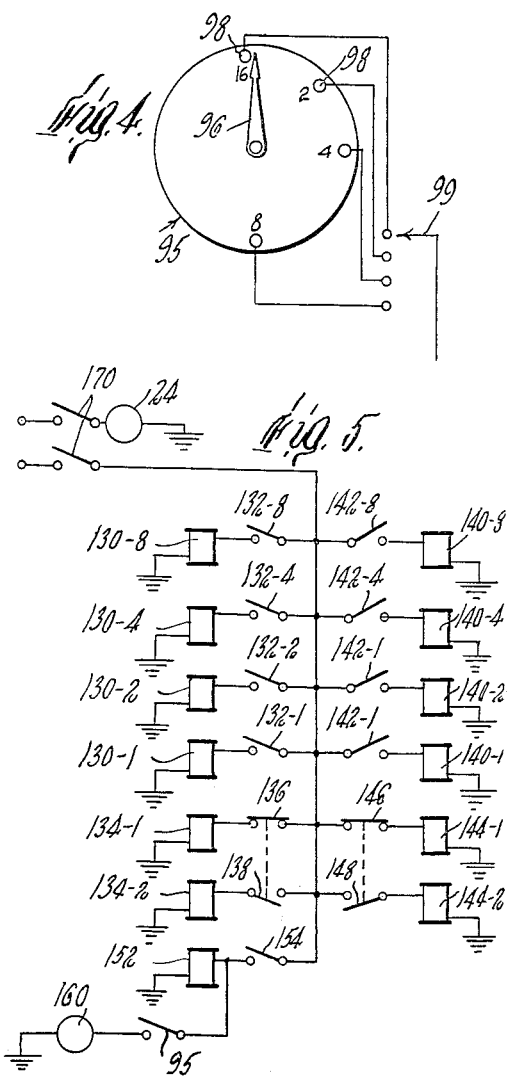

United States Patent Office 2,957,371
Patented Oct. 25, 1960

2,957,371

MECHANICAL PROPORTIONING MEANS

An Wang, Lincoln, Mass., assignor to Wang Laboratories, Inc., Natick, Mass., a corporation of Massachusetts Filed Dec. 15, 1958, Ser. No. 780,556

1 Claim. (Cl. 74—720.5)

This invention relates to control systems and apparatus particularly including novel mechanical proportioning means for interrelating rates and distances to provide predetermined ratios between the feeds of a plurality of machine tool elements, for example, as well as means for maintaining such rates, distances and ratios for predetermined distances and times and for varying such rates substantially instantaneously so that, for example, elements of a machine tool or the like may be moved substantially simultaneously at periodically varying ratios to produce a contoured cut or other surface and to perform other functions as desired.

In automatic machine tools, such as lathes, milling machines, grinders, flame cutters and the like, particularly when cutting contours, it is necessary to move the tool simultaneously by its longitudinal feed, its transverse feed, and possibly by its vertical feed as well. This has heretofore been accomplished in a variety of ways, for example, purely mechanically, as by using suitable linkages to move the tool in response to movement of an element along a cam or other pattern, or, alternatively, either electrically or hydraulically in response to signals from an appropriate control. The latter type of arrangement is desirable for machine flexibility, that is, the ability to produce a variety of products in relatively short runs without an uneconomical amount of down time and labor for the change-over from one product to another. Thus, in order to reduce the down time to a minimum, it has been proposed that operational commands be fed to a machine tool in the form of magnetic tape, punched tape, cards or the like, so that a tape portion or punched card represents the entire information necessary for the machining of a particular product. This technique has great advantages, as the required tapes or cards can be made up in advance, so that down time is nearly eliminated, except possibly for tool changes.

Such a technique is relatively simple to apply when but one machine element is to be moved at a time to produce a straight longitudinal or cross cut. However, when two or more machine elements must be moved simultaneously at interrelated speeds and distances to produce a tapered or other contoured cut, the problem becomes much more difficult, especially in view of the necessity to shift the proportionally related speeds of two or more machine elements substantially instantaneously and simultaneously. This has been accomplished in a practical manner by means of electronic apparatus utilizing scalers together with associated switches, adders and storage devices, but such apparatus is relatively too complicated and expensive for many applications, especially to conventional machine tools.

Accordingly, it is a main object of the invention to provide novel control systems including mechanical proportional displacement means for interrelating rates and distances to provide predetermined ratios between the feeds of a plurality of elements so that a tool, for example, may be moved to produce contoured cuts.

It is another main object of the invention to provide means for changing said ratios from one predetermined value to another predetermined value substantially instantaneously.

It is still another object of the invention to provide means for establishing the distance and time during which a predetermined ratio is maintained.

A particular feature of the invention lies in its extraordinary simple mechanical structure, providing uniquely trouble-free operation.

The proportional displacement mechanism of the present invention in general contemplates the provision of at least two sequential series of differentials, preferably interconnected to provide either a binary or a decimal geometrical series, and driven individually through clutches having predetermined angular displacement and locking characteristics, for example, single revolution lock-out clutches, all of the clutches being driven preferably at a common speed from a common driving member.

More specifically, the differentials of each series are arranged to drive one of the two or more related machine elements, and are constantly coupled to one another such that each differential of a series other than the first receives the entire output of its predecessor in the series for reduction in a predetermined manner and transmission to its driven machine element in successively decreasing angular displacement in inverse proportion to the number of differentials. Each of the clutches has its input connected to the driving member as above stated and its output connected to one only of the differentials. The output of each of the series of differentials is provided with suitable clutched reversing mechanisms. Means, such as a punched tape and associated circuitry, are provided for selectively operating each of the series of clutches to a preselected condition of angular displacement and locking, that is, an integral number of turns with a single revolution lock-out clutch, providing substantially simultaneously and independently from each of the outputs of the series of differentials, a series of angular displacements decreased relatively to the input angular displacement of the input driving member by a ratio established by the condition of the clutches of each of the series. This structure uniquely provides, then, a digital system, composed of single turns, for example, if single revolution clutches be used, with each differential of a series acting to divide its inputs by two, say, if a binary system be used, and add its so-divided inputs together for transmission to the next succeeding differential or output, so that the differentials of a series may be selected as desired to produce a desired digital ratio between driven input member and the tool element driven by a differential series. Hence, any desired digital ratio may be selected between two or more tool elements, and such ratio may be simultaneously and instantaneously changed by so changing clutch conditions. Direction of rotation may be likewise changed by operating the reversing mechanisms. The number of differentials and associated clutches of a series will depend upon the numerical ratios required for a particular system, for example, if ratios between 1 and 15 be sufficient, three or four differentials and four clutches are needed in a binary system. A decimal system will require three or four differentials, with appropriate gearing.

The novel features of the invention, together with further objects and features thereof will be more readily understood when considered in connection with the following description of preferred embodiments thereof, together with the accompanying drawings, in which:

Fig. 1 is a diagrammatic view illustrating a binary control system of the present invention as applied to a lathe;

Fig. 2 is a diagrammatic view of a typical tape punched with operational commands for the lathe cut of Fig. 1;

Fig. 3 is a view of a clutch element of the structure of Fig. 1;

Fig. 4 is a view of a switch element of the structure of Fig. 1;

Fig. 5 is a circuit diagram associated with the structure of Fig. 1; and

Fig. 6 is a diagrammatic view illustrating a portion of a decimal control system of the present invention.

Referring first to Fig. 1, the machine tool therein diagrammatically shown is a lathe having a base 20 on which is mounted a rotatable spindle carrying a chuck 22 for supporting therein a workpiece W, said chuck being driven by a suitable drive motor 24. A longitudinally sliding carriage 26 is mounted in suitable ways on base 20, with a transversely movable tool slide 28 carrying a tool T in turn being suitably mounted on carriage 26. Said carriage 26 is driven by a suitable lead screw 30, tool slide 28 also being driven by a lead screw 32 through bevel gears 34 and spline 36. These elements are well known in the art and need not further be described. Of course, other types of machine tools are generally similar. For example, a grinding machine is almost identical, except for the substitution of a grinding wheel for a lathe tool, while a milling machine, for example, has a stationary workpiece with the tool head carrying a rotating milling cutter which may be moved along three mutually perpendicular axes.

In general, the novel digital mechanical proportional control system of the present invention may be applied to any type of machine tool by means of suitable actuators to provide simultaneous interrelated feed rates and distances in two or more directions, as well as to other mechanisms wherein interrelated rates and distances may be involved. As applied to a lathe or other machine tool, the system of the invention may be considered as a digital gearbox providing a proportional displacement mechanism having a large number of ratios and being capable of instantaneous shifting without stopping the machine so that successive operations may be carried out automatically by the use of coded instructions on a punched tape or the like to produce a workpiece having a succession of cuts closely to simulate a contoured surface.

According to the present invention, these objects are accomplished from coded commands on a punched tape or the like, such as is shown in Fig. 2, by the utilization of at least two sequential series of differentials with associated clutches together with means to establish a predetermined number of input turns supplied from drive motor 24 through its clutch 90, the differentials and associated clutches in effect operating as scaling or dividing elements to produce from a predetermined angular displacement a plurality of individual displacements each of which may be selectively fed through its associated clutch to a differential while simultaneously feeding that differential from a preceding differential. The scaling or dividing function of such a series can be determined by the type of differential such as an epicyclic gear mechanism having two differentially connected inputs and an output which adds the inputs, or it can be determined by separate gearing interconnecting such differentials, or applied to their inputs, or combinations thereof. With differentials of the epicyclic bevel gear type as herein shown, the output will be half of the sum of the two inputs, particularly useful for a binary device. However, other relations can be achieved by means of suitable gearing between differentials or between their inputs. Particular ones of the differentials are selected by suitable clutching of a differential input, the selected inputs being added together at the output to provide a specific predetermined number of full turns, say, or other specific angular displacements at the output of a series of differentials. This establishes a predetermined ratio between the series of differentials. The direction of rotation of each series may be established by suitable reversing mechanisms having clutches similar to those of the differentials and gear ratios to preserve the predetermined ratio established between the series of differentials.

More specifically, a driving shaft 40 is provided for driving each of the two series of differentials 52, 54, 56, 58 and 72, 74, 76, 78 through their clutches 62, 64, 66, 68 and 82, 84, 86, 88 respectively by means of suitable pinions 42, 44, 46 and 48 thereon. Driving shaft 40 is in turn driven by motor 24 through clutch 90, and also has mounted thereon a pinion 92 driving a pinion 94 at one-sixteenth speed to revolve a switch 95 one revolution for each 16 turns of shaft 40. Output reverse mechanisms are provided for each of the series, for series 52, 54, 56, 58, a direct drive clutch 50 and reverse drive clutch 59 driving through a reversing pinion 60, and for series 72, 74, 76, 78, a direct drive clutch 70 and reverse drive clutch 79 driving through a reversing pinion 80.

The differentials preferentially utilized are all identical and are of the epicyclic bevel gear type. Thus, each has an output bevel gear 102 driving a shaft 103, an axially aligned input bevel gear 104 driven by a shaft 105, and a pair of bevel gears 106 and 107 interposed therebetween for rotation on a spider 108, the spider being driven by a pinion 109 to provide another input, the control input. Each axial input of a bevel gear of either series is connected to the output bevel gear of the immediately preceding gear of the series, with said inputs of the first differentials of each series, 58 and 78 being locked and the outputs of the final differentials 52 and 72 driving lead screw 30 and spline 36 through their reversing mechanisms. Thus, each bevel gear of a series receives the entire output of its predecessor in the series and may selectively receive through its associated clutch an input from driving shaft 40.

The clutches of each series, 62, 64, 66, 68 and 82, 84, 86, 88 as well as reversing mechanism clutches 50, 59, 70, 79 and input clutch 90 are each of the type having predetermined angular displacement and locking characteristics, and are preferably of the type shown in Fig. 3. In that figure, a driven output clutch plate 120 cooperates with a continuously operated driving clutch plate 122 having a notch 124 in its periphery, by means of a driving pawl 126 selectively operated to engage with said notch by means of a latch 128 operated by a solenoid 130. Thus, when solenoid 130 is in its down position as shown, so that latch 128 engages pawl 126, the driven plate 120 is locked against rotation in a predetermined angular position. When solenoid 130 pulls up, latch 128 disengages pawl 126 so that said pawl will be engaged in notch 124 to drive plate 122 for an integral number of turns, until solenoid 130 again moves to its downward position so that the clutch plates will be disengaged when the driven plate 122 next reaches its predetermined angular position as shown.

Returning to Fig. 1, the driven plate 122 of each of the clutches 62, 64, 66, 68 and 82, 84, 86, 88 is operated respectively from gears 42, 44, 46, 48 by pinions 61, 63, 65, 67 and 81, 83, 85 and 87, and the output plate 120 drives an input of differentials 52, 54, 56, 58 and 72, 74, 76, 78 through pinions 109 thereof through clutch output pinions 51, 53, 55, 57 and 71, 73, 75, 77 mounted on clutch output plates 120. The input clutch 90 has its input plate driven by motor 24 and its output plate directly driven by shaft 40. The switch 95 is driven by said shaft at one-sixteenth speed, and, as shown in Fig. 4, includes a driven switch element 96 and a plurality of terminals 98-2, 98-4, 98-8 and 98-16, any one of which may be selected by a selector switch 99. Reversing mechanism clutches 50, 59, 70, 79 have their input clutch plates driven by the output shaft 103 of the final differential of each series. Their output clutch plates either drive lead screw 30 or 32 directly with forward clutches 50, 70 or through reversing pinions 60, 80 with reverse clutches 59, 79.

In Fig. 5 is shown circuitry for operating the structure of Fig. 1 as controlled by a punched tape and its operating mechanism such as is diagrammatically shown in Fig. 2. Thus, each of the series of clutches is provided with an operating solenoid, the series 62, 64, 66, 68 with solenoids 130-8, 130-4, 130-2, 130-1 and the series 82, 84, 86, 88 with solenoids 140-8, 140-4, 140-2, 140-1. Each of these solenoids is operated by a switch 132-8, 132-4, 132-2, 132-1 and 142-8, 142-4, 142-2, 142-1, respectively, opened and closed by one series of holes 162-8, 162-4, 162-2, 162-1 or 164-8, 164-4, 164-2, 164-1 in perforated tape 161. Another series of holes 172 and 174 is also shown. Solenoids 134-1 and 134-2 are provided for driving forward and reverse clutches 50 and 59 respectively for longitudinal feed screw 30 and solenoids 144-1 and 144-2 for clutches 70 and 79 for transverse feed screw 32. Linked normally closed switches 136, 146 and normally open switches 138, 148 are provided for solenoids 134-1, 144-1, 134-2 and 144-2 respectively, such switches being operated by punched tape holes 163, 165 for switches 136, 138 and 146, 148 respectively. Additional holes 173, 175 are provided with the second series of holes 172, 174. An additional solenoid 152 is provided for main shaft clutch 90 for operation by switch 154 and hole 167 or 177 in tape 161. Tape 161 is provided with a driving motor 160 in the usual manner, such driving motor being operated both through switch 154 and switch 95, assuming it be connected to terminal 98-16 of said latter switch as shown. A main switch 170 is provided for energizing main motor 24 as well as the described control circuit.

In operation, assuming a tape 161 punched as shown in Fig. 2, wherein dark circles indicate holes which will cause a switch to be closed, and with all of the switches open as shown in Fig. 5, main switch 170 is first closed. This starts motor 24 and permits the other switches to be energized. As may be seen in Fig. 2, the series of coded perforations 162 associated with switches 132 controlling the longitudinal feed of the lathe are open at 162-8 and 162-2, producing a total of 10 units of longitudinal feed. The series of coded perforations 164 associated with switches 142 controlling the transverse feed are open at 164-2 and 164-1, producing a total of 3 units of transverse feed. Input clutch 90 is engaged by cooperation of its switch 154 with open perforation 163. Forward reversing clutches 50 and 70 are engaged because of the absence of an open hole at 163, 165. Shaft 40 proceeds to turn for 16 turns, during which the longitudinal feed advances 10 turns and the transverse 3 turns, and switch 95 by reason of its 16:1 drive then closes to start tape motor 160 which substantially instantaneously advances the tape 161 so that the next series of coded perforations 172, 174 are engaged by switches 132, 142 respectively. Perforations 172-4, 172-2, 172-1 being open represents 7 turns and perforation 174-4 being open represents 4 turns. Reversing mechanism holes 173, 175 still being closed keeps the forward clutches thereof engaged. Again this causes the main shaft 40 to make 16 turns, and the longitudinal and transverse feed to make 7 and 4 turns respectively. Reversing clutches 59, 79 may be energized by coded tape perforations, not shown, for reversing the mechanism to its original position. It should be noted that these are unit turns because of the single revolution locking clutches, and that the unit turns of the preceding setting automatically complete their revolution before beginning the new series.

In more detail, consider the action of the series of differentials 52, 54, 56, 58 in producing a 10 turn output upon 16 turns of main shaft 40. To accomplish this, clutches 62 and 66 are engaged, with clutches 64 and 68 locked out. Thus, differential 58 produces no output, since one of its inputs is permanently locked and its clutch 68 is locked out. Differential 56 produces 8 turns output by reason of its clutch being operative, its input from differential 68 being zero, and the fact that it produces at its output half of its 16 turn input from shaft 40. Differential 54 produces 4 turns output by reason of its dividing by a factor of two its input from differential 56, and its other input at clutch 64 being locked. Differential 52 produces 10 turns output to the the lead screw 30, because its 4 turn input from differential 54 produces 2 turns output and its 16 turn input from shaft 40, its clutch 62 being engaged, produces 8 turns output. It will be understood that all gear ratios in the system shown are 1 to 1 unless otherwise stated.

It will be appreciated that other types of differentials may have mechanical constructions that will not permit their design to divide by two, for example, and in such cases gears can be interposed therebetween or at a clutched input to provide the desired ratio. Also, other series than binary may be desired, for example, a decimal series such as is shown in Fig. 6 is useful for many purposes. In that figure, a series of differentials 180, 182, 187 is provided, each having an input clutch as above described, respectively 190, 192, 194, 196 all driven from a common main shaft 198. In this instance, however, the clutch inputs to the differentials of the series are not necessarily driven at the same speed as the main shaft 198. Thus, specifically, the final differential of the series, differential 180 is driven at shaft speed so that its output is half of shaft speed, or 5 turns for an input of 10 turns. The next to final differential of the series, differential 182, is driven at its clutch input at 4/5 shaft speed through gears 181, 183 of that ratio, to itself produce an output of 4 turns with a main shaft input of 10 turns. This will produce an output of 2 turns at differential 180, which will be added to its 5 turn output which will be present if its clutch 190 be engaged. The third differential 187 of the series is driven at one of its clutch inputs at 8/5 shaft speed through gears 185, 186 which will effect an output at final differential 180 of 2 turns, and at the other of its clutch inputs at 4/5 shaft speed through gears 188, 189 which will effect an output at final differential 180 of 1 turn. Thus, the possible output of final differential 180 is 5+2+2+1 or 10 turns, permitting selection of any integral number of turns from 0 to 10 upon rotation of 10 turns by main shaft 198 simply by selecting the appropriate one or ones of chutches 190 through 196. A switch similar to switch 95 but driven at a 10 to 1 ratio is utilized to provide a 10 turn input to shaft 198. As with the binary system above described, an additional differential having a locked input may be utilized if desired in lieu of two clutched inputs at appropriate ratios to the first differential of the series. Conversely, a three differential binary series may be provided by utilizing two clutched inputs, one at double shaft speed, to a first of a three-differential series capable of operation as with the four differential series described.

Of course, the differential series described in detail herein, particularly the binary system, is simpler than would normally be employed, that is, many more differentials would be utilized in a series to provide a great many ratios. In this latter case, the ability to use but a portion of the available maximum input turns becomes important. Such may be accomplished by a selector switch 95 such as is shown in Fig. 4, preferably operated by a suitable hole in the perforated tape, to select a less than maximum number of input shaft turns, say 8, 4, 2 or 1 in accordance with the desired ratio of longitudinal to transverse feed.

With decimal systems, normally more than one series for each output needed would be utilized, depending upon the number of significant figures to be controlled. Such series can be interconnected by differential mechanisms having appropriate gear ratios, that is, the next highest significant figure should be related in a 10:1 ratio to its next lower significant figure. Suitable structures will be apparent from the above described specific structures.

It will thus be seen that the invention provides novel mechanical proportional digital displacement mechanisms which make possible the provision of uniquely simple control systems for interrelating rates and distances to provide predetermined ratios between the feeds of a plurality of machine tool elements, for example, as well as means for varying same to produce contoured cuts or the like. It will be apparent to those skilled in the art that the invention is susceptible of numerous modifications not herein specifically disclosed. Accordingly, the invention is not to be construed as limited specifically as shown herein, but only as defined in the appended claim.

I claim:

In a control system, mechanical proportional decimal digital displacement mechanism comprising a driving member, a driven member, a sequential series of at least three differentials for said driven member, each of said differentials having a plurality of interrelated elements with an output element of each being connected to an input element of the successive differential and the output of the last differential being connected to said driven member such that each differential of said series other than the first receives the entire output of its predecessor in the series for reduction in a predetermined manner and transmission to said driven member in successively decreasing angular displacement in inverse proportion to the number of differentials, a series of clutch means having predetermined angular displacement and locking characteristics preventing rotation with each clutch means of said series having its input drivingly connected to said driving member and its output connected to a control element of one only of said differentials, and means for selectively operating each of said clutch means to a preselected condition of angular displacement and locking preventing rotation providing from the output of said differentials a ratio established by the condition of said clutch means, said ratio being made up of the sum of ratios of each differential and its associated clutches with the final differential clutch input providing a ratio of 5 turns output for 10 turns clutched input, the next preceding differential clutch input providing a ratio of 2 turns output for 10 turns clutched input, and preceding differential-clutched inputs providing ratios of 2 turns output for 10 turns clutched input and 1 turn output for 10 turns clutched input for selection by said clutches of any desired digital ratio from 0 to 10.

References Cited in the file of this patent
UNITED STATES PATENTS

| | | |
|---|---|---|
| 2,521,771 | Bechle | Sept. 12, 1950 |
| 2,902,887 | Tripp | Sept. 8, 1959 |